US011161562B2

(12) United States Patent
Kawasaki et al.

(10) Patent No.: US 11,161,562 B2
(45) Date of Patent: Nov. 2, 2021

(54) CONTROLLING DEVICE, INDICATING SYSTEM, AND CONTROLLING METHOD

(71) Applicant: SHIMANO Inc., Sakai (JP)

(72) Inventors: Yasunaga Kawasaki, Sakai (JP); Keiji Terashima, Sakai (JP); Daisuke Watanabe, Sakai (JP); Yoshiyuki Kasai, Sakai (JP); Hiroaki Takeshita, Sakai (JP); Taketoshi Sato, Sakai (JP); Takeshi Ueda, Sakai (JP)

(73) Assignee: Shimano Inc., Sakai (JP)

( * ) Notice: Subject to any disclaimer, the term of this patent is extended or adjusted under 35 U.S.C. 154(b) by 109 days.

(21) Appl. No.: 16/218,826

(22) Filed: Dec. 13, 2018

(65) Prior Publication Data
US 2019/0185092 A1    Jun. 20, 2019

(30) Foreign Application Priority Data

Dec. 18, 2017 (JP) ............................. JP2017-241475

(51) Int. Cl.
| | |
|---|---|
| *B62J 3/00* | (2020.01) |
| *B62J 99/00* | (2020.01) |
| *B60S 5/00* | (2006.01) |
| *G07C 5/08* | (2006.01) |
| *B62M 9/132* | (2010.01) |
| *B62M 25/00* | (2006.01) |
| *B62K 23/02* | (2006.01) |
| *B62M 9/122* | (2010.01) |
| *B62L 3/02* | (2006.01) |
| *B62J 1/08* | (2006.01) |
| *B62J 45/20* | (2020.01) |
| *B62J 45/40* | (2020.01) |

(Continued)

(52) U.S. Cl.
CPC . *B62J 3/00* (2013.01); *B60S 5/00* (2013.01); *B62J 99/00* (2013.01); *B62K 23/02* (2013.01); *B62L 3/02* (2013.01); *B62M 9/122* (2013.01); *B62M 9/132* (2013.01); *B62M 25/00* (2013.01); *G07C 5/0825* (2013.01); *B62J 45/20* (2020.02); *B62J 45/40* (2020.02); *B62J 50/20* (2020.02); *B62J 50/25* (2020.02); *B62J 2001/085* (2013.01); *G07C 5/085* (2013.01)

(58) Field of Classification Search
CPC .... B62J 99/00; B62J 3/00; B60S 5/00; B62M 25/00
See application file for complete search history.

(56) References Cited

U.S. PATENT DOCUMENTS

| | | | |
|---|---|---|---|
| 2002/0094906 A1* | 7/2002 | Jordan | ................... B62M 25/08 475/254 |
| 2016/0067547 A1* | 3/2016 | Anthony | ............. G01P 15/0891 702/141 |

(Continued)

FOREIGN PATENT DOCUMENTS

| | | |
|---|---|---|
| CN | 101625398 B | 6/2012 |
| DE | 102011077181 A1 | 12/2012 |

(Continued)

*Primary Examiner* — Curtis B Odom
(74) *Attorney, Agent, or Firm* — Alleman Hall Creasman & Tuttle LLP (57) ABSTRACT

A controlling device includes a storage device configured to store predetermined information about durability of a component of a man-powered vehicle, and a controller configured to control an indicator based on the predetermined information.

27 Claims, 7 Drawing Sheets

(51) Int. Cl.
*B62J 50/20* (2020.01)
*B62J 50/25* (2020.01)

(56) References Cited

U.S. PATENT DOCUMENTS

| | | | |
|---|---|---|---|
| 2016/0144928 A1* | 5/2016 | Chun | B62M 6/45 |
| | | | 701/22 |
| 2016/0221627 A1* | 8/2016 | Hines | B62H 5/20 |
| 2018/0013833 A1* | 1/2018 | Ostergaard | B62J 99/00 |

FOREIGN PATENT DOCUMENTS

| | | |
|---|---|---|
| JP | H11295190 A | 10/1999 |
| JP | 2003040090 A | 2/2003 |

\* cited by examiner

CONTROLLING DEVICE, INDICATING SYSTEM, AND CONTROLLING METHOD

TECHNICAL FIELD

The present invention relates to a controlling device, an indicating system, and a controlling method.

BACKGROUND ART

Conventionally, users of vehicles often visually check parts of the vehicles to determine whether maintenance needs to be performed on the parts. Patent Literature 1 describes a method of indicating a maintenance timing for each part in order to cause maintenance to be performed on each part at an appropriate timing.

PRIOR ART LITERATURE

Patent Literature

Patent Document 1
JP 2003-40090 A

SUMMARY OF INVENTION

Technical Problem

In man-powered vehicles, a technique for performing maintenance on each component at an appropriate timing is also demanded.

The present invention has been made to solve the above-mentioned problem, and an object thereof is to provide a controlling device, an indicating system, and a controlling method capable of informing a user of information about maintenance of a component at an appropriate timing.

Solution to Problem

To solve the above-mentioned problem and achieve the object, a controlling device according to a first aspect of the present disclosure includes: a storage device configured to store predetermined information about durability of a component of a man-powered vehicle; and a controller including a processor configured to control an indicator based on the predetermined information.

According to the first aspect, the controlling device can inform a user of information about maintenance of the component at an appropriate timing.

In the controlling device of a second aspect according to the first aspect, the storage device stores history information about usage histories of the component, and the controller controls the indicator based on the predetermined information and the history information.

According to the second aspect, the controlling device can inform a user of the information about the maintenance of the component at an appropriate timing.

In the controlling device of a third aspect according to the second aspect, the component includes a chain, and the history information includes at least one of a driving distance of the man-powered vehicle, a driving period of the man-powered vehicle, and the number of speed shifts performed in the man-power vehicle.

According to the third aspect, the controlling device can inform a user of a maintenance timing for the chain at an appropriate timing.

In the controlling device of a fourth aspect according to the second aspect, the component includes a sprocket, and the history information includes at least one of a driving distance of the man-powered vehicle, a driving period of the man-powered vehicle, and the number of speed shifts performed in the man-power vehicle.

According to the fourth aspect, the controlling device can inform a user of a maintenance timing for the sprocket at an appropriate timing.

In the controlling device of a fifth aspect according to the fourth aspect, the component includes a rear sprocket assembly, the sprocket is one of a plurality of sprockets included in the rear sprocket assembly, the history information includes at least one of a driving distance of each of the sprockets and a driving period of each of the sprockets.

According to the fifth aspect, the controlling device can inform a user of the maintenance timing for the sprocket at an appropriate timing even when the maintenance timing for only one of the multiple sprockets has come.

In the controlling device of a sixth aspect according to the fourth aspect, the component includes a crank assembly, the sprocket is one of a plurality of sprockets included in the crank assembly, the history information includes at least one of a driving distance of each of the sprockets and a driving period of each of the sprockets.

According to the sixth aspect, the controlling device can inform a user of the maintenance timing for the sprocket at an appropriate timing even when the maintenance timing for only one of the multiple sprockets has come.

In the controlling device of a seventh aspect according to the second aspect, the component includes a speed changing device, and the history information includes at least one of an operating period of the speed changing device and the number of operations of the speed changing device.

According to the seventh aspect, the controlling device can inform a user of a maintenance timing for the speed changing device at an appropriate timing.

In the controlling device of an eighth aspect according to the second aspect, the component includes a wheel, and the history information includes the number of rotations of the wheel in a predetermined moving distance of the man-powered vehicle.

According to the eighth aspect, the controlling device can detect tire air pressure based on the number of rotations of the wheel in the predetermined distance, thereby making it possible to inform a user of an adjustment timing for the tire air pressure.

In the controlling device of a ninth aspect according to the eighth aspect, the storage device stores weight information about a weight of the man-powered vehicle in a ride state, and the controller controls the indicator based on the predetermined information, the history information, and the weight information.

According to the ninth aspect, the controlling device can take into consideration a change in tire circumferential length due to tire deformation caused by a weight of a user, thereby making it possible to inform the user of the adjustment timing for the tire air pressure more accurately.

In the controlling device of a tenth aspect according to the second aspect, the component includes a brake device, and the history information includes at least one of an operating period of the brake device and the number of operations of the brake device.

According to the tenth aspect, the controlling device can inform a user of a maintenance timing for a brake member (a brake shoe or a brake pad) at an appropriate timing.

In the controlling device of an eleventh aspect according to the second aspect, the component includes an assist device assisting driving of the man-powered vehicle using an electric motor, and the history information includes at least one of a driving distance of the man-powered vehicle and a driving period of the man-powered vehicle.

According to the eleventh aspect, the controlling device can inform a user of a check timing or an adjustment timing for the assist device at an appropriate timing.

In the controlling device of a twelfth aspect according to the second aspect, the component includes a suspension, and the history information includes at least one of a driving distance of the man-powered vehicle, a driving period of the man-powered vehicle, a usage period of the suspension, an operating period of the suspension, and the number of operations of the suspension.

According to the twelfth aspect, the controlling device can inform a user of a check timing or an adjustment timing for the suspension at an appropriate timing.

In the controlling device of a thirteenth aspect according to the second aspect, the component includes an adjustable seat post, and the history information includes at least one of a driving distance of the man-powered vehicle, a driving period of the man-powered vehicle, a usage period of the adjustable seat post, an operating period of the adjustable seat post, and the number of operations of the adjustable seat post.

According to the thirteenth aspect, the controlling device can inform a user of a check timing or an adjustment timing for the adjustable seat post at an appropriate timing.

In the controlling device of a fourteenth aspect according to the second aspect, the component includes an operating device operating at least one of a speed changing device, a brake device, an assist device assisting driving of the man-powered vehicle, an suspension, and an adjustable seat post, and the history information includes at least one of an operating period of the operating device and the number of times that the operating device is operated.

According to the fourteenth aspect, the controlling device can inform a user of a maintenance timing for the operating device at an appropriate timing.

In the controlling device of a fifteenth aspect according to the fourteenth aspect, the operating device includes an operating cable, and the history information includes at least one of an operating period of the operating cable and the number of operations of the operating cable.

According to the fifteenth aspect, the controlling device can inform a user of a maintenance timing for the operating cable of the operating device at an appropriate timing.

In the controlling device of a sixteenth aspect according to the fourteenth aspect, the operating device includes a hydraulic mechanism, and the history information includes at least one of a usage period of the operating device and a usage period of hydraulic oil of the hydraulic mechanism.

According to the sixteenth aspect, the controlling device can inform a user of a maintenance timing for the hydraulic oil of the hydraulic mechanism at an appropriate timing.

In the controlling device of a seventeenth aspect according to the fourteenth aspect, the operating device includes a primary cell, and the history information includes a usage period of the primary cell in the operating device.

According to the seventeenth aspect, the controlling device can inform a user of a maintenance timing for the primary battery of the operating device at an appropriate timing.

In the controlling device of an eighteenth aspect according to the second aspect, the component includes a rechargeable battery, and the history information includes at least one of the number of times that the rechargeable battery is charged, the number of times that the rechargeable battery is discharged, and a deteriorating state of the rechargeable battery.

According to the eighteenth aspect, the controlling device can inform a user of a maintenance timing for the battery at an appropriate timing.

In the controlling device of a nineteenth aspect according to any one of the first to eighteenth aspects, the indicator includes at least one of a cycle computer, eyewear, a smartphone, a tablet device, a smart watch, a personal computer, a lamp, and a speaker.

According to the nineteenth aspect, the controlling device can inform a user of the information about the maintenance of the component at an appropriate timing.

In the controlling device of a twentieth aspect according to any one of the first to nineteenth aspects, the indicator outputs at least one of sound, light, and vibration.

According to the twentieth aspect, the controlling device allows a user to easily recognize the indication by the indicator.

To solve the above-mentioned problem and to achieve the object, an indicating system according to a twenty-first aspect of the present disclosure includes a controlling device according to any one of the first to twentieth aspects; and the indicator.

According to the twenty-first aspect, the indicating system can inform a user of the information about the maintenance of the component at an appropriate timing.

In the indicating system of twenty-second aspect according to the twenty-first aspect, the indicator is provided with a housing including therein the controlling device.

According to the twenty-second aspect, the indicating system enables downsizing a space occupied by the controlling device and the indicator.

In the indicating system of a twenty-third aspect according to the twenty-first aspect, the controlling device is mounted on the man-powered vehicle, and the indicator is mounted apart from the controlling device on the man-powered vehicle.

According to the twenty-third aspect, the indicating system increases the flexibility in the arrangement of the controlling device and the indicator.

In the indicating system of a twenty-fourth aspect according to any one of the twenty-first to twenty-third aspects, the indicator is provided with an indication unit, and the indication unit displays at least an image of the man-powered vehicle including the component, and information about maintenance of the component.

According to the twenty-fourth aspect, the indicating system allows a user to easily understand the information.

To solve the above-mentioned problem and to achieve the object, a controlling method according to a twenty-fifth aspect of the present disclosure includes a first step of controlling an indicator based on predetermined information about durability of a component of a man-powered vehicle.

According to the twenty-fifth aspect, a user of can be informed of information about maintenance of the component at an appropriate timing.

The controlling method of a twenty-sixth aspect according to the twenty-fifth aspect further includes a second step of controlling the indicator based on the predetermined information and history information about usage histories of the component.

According to the twenty-sixth aspect, a user can be informed of the information about the maintenance of the component at an appropriate timing.

In the controlling method of a twenty-seventh aspect according to the twenty-fifth or twenty-sixth aspect, the component includes at least one of a chain, a sprocket, a speed changing device, a wheel, a brake device, an assist device assisting driving of the man-powered vehicle, a suspension, an adjustable seat post, an operating device, and a battery.

According to the twenty-seventh aspect, a user can be informed of the information about the maintenance of the component at an appropriate timing.

The controlling method of a twenty-eighth aspect according to any one of the twenty-fifth to twenty-seventh aspects, the indicator includes at least one of a cycle computer, eyewear, a smartphone, a tablet device, a smart watch, a personal computer, a lamp, and a speaker.

According to the twenty-eighth aspect, a user can be informed of the information about the maintenance of the component at an appropriate timing.

Advantageous Effects of Invention

According to the present invention, the user can be informed of the information about the maintenance of the component at an appropriate timing.

DESCRIPTION OF EMBODIMENTS

Hereinafter, preferred embodiments of the present invention will be described in detail with reference to the accompanying drawings. The present invention is not limited by the embodiments. When there is a plurality of embodiments, the present invention encompasses combinations of the respective embodiments. In the following embodiments, a bicycle is described as an example of a man-powered vehicle. The present invention is also applicable to man-powered vehicles other than the bicycle.

First Embodiment

Figure 1:
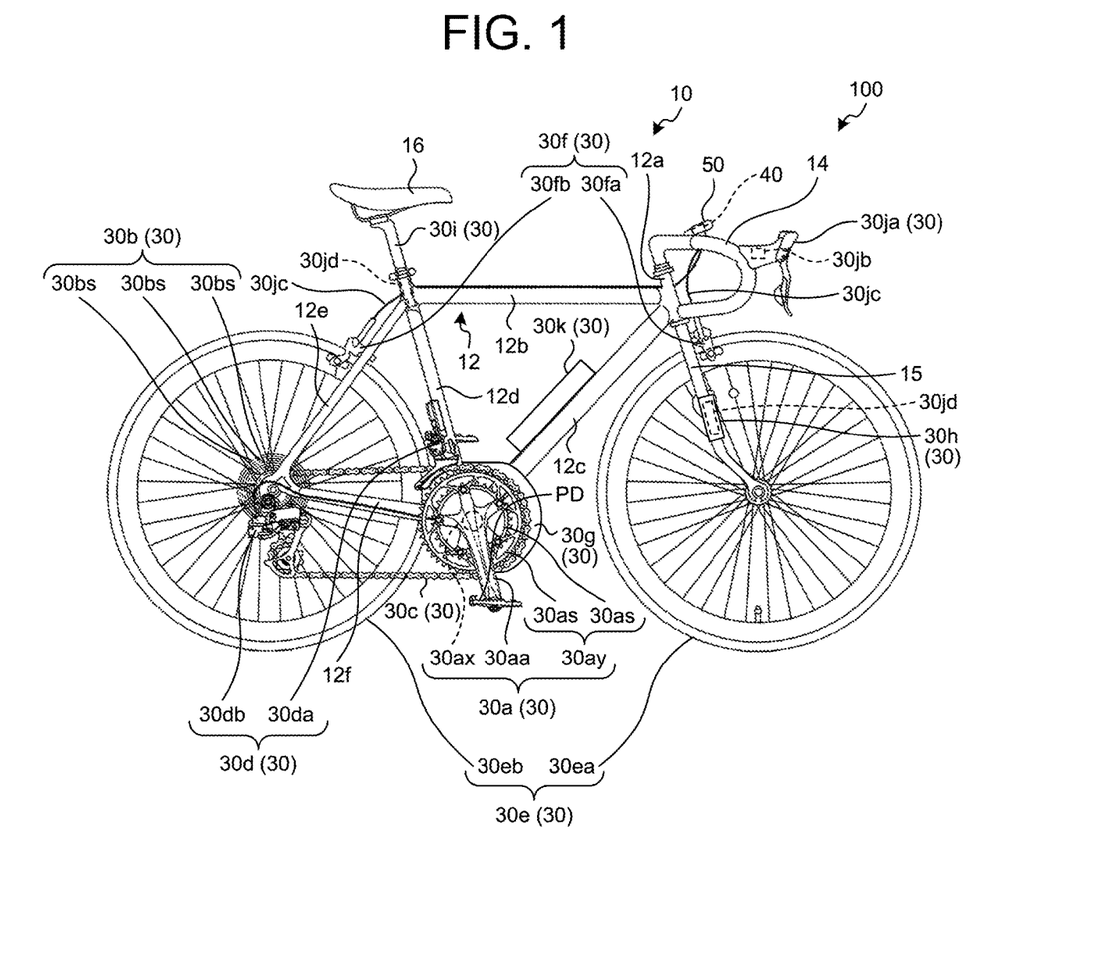
FIG. 1 is a schematic front view of a man-powered vehicle according to a first embodiment.

FIG. 1 is a schematic front view of a man-powered vehicle according to a first embodiment. A man-powered vehicle 10 according to the first embodiment is a vehicle driven by human power. The man-powered vehicle 10 in the first embodiment is a bicycle. The man-powered vehicle 10 includes a frame 12, a fork 15, a handlebar 14, a saddle 16, components 30, a controlling device 40, and an indicator 50. An indicating system 100 includes the controlling device 40 and the indicator 50.

The frame 12 includes a head tube 12a, a top tube 12b, a down tube 12c, a seat tube 12d, a seat stay 12e, and a chain stay 12f. The head tube 12a supports the handlebar 14 and the fork 15. One end of the top tube 12b is connected to the head tube 12a while the other end of the top tube 12b is connected to the seat tube 12d. One end of the down tube 12c is connected to the head tube 12a while the other end of the down tube 12c is connected to the seat tube 12d. One end of the seat stay 12e is connected to the seat tube 12d while the other end of the seat stay 12e is connected to the chain stay 12f. One end of the chain stay 12f is connected to the seat tube 12d while the other end of the chain stay 12f is connected to the seat stay 12e.

The handlebar 14 is a member that a user of the man-powered vehicle 10 grips. The handlebar 14 is rotatable with respect to the head tube 12a. The handlebar 14 is rotated, so that the fork 15 rotates and a traveling direction of the man-powered vehicle 10 changes.

The saddle 16 is a member of the man-powered vehicle 10 that supports the user's buttocks. The saddle 16 is supported by the seat tube 12d via an adjustable seat post 30i, which is described later.

Figure 2:
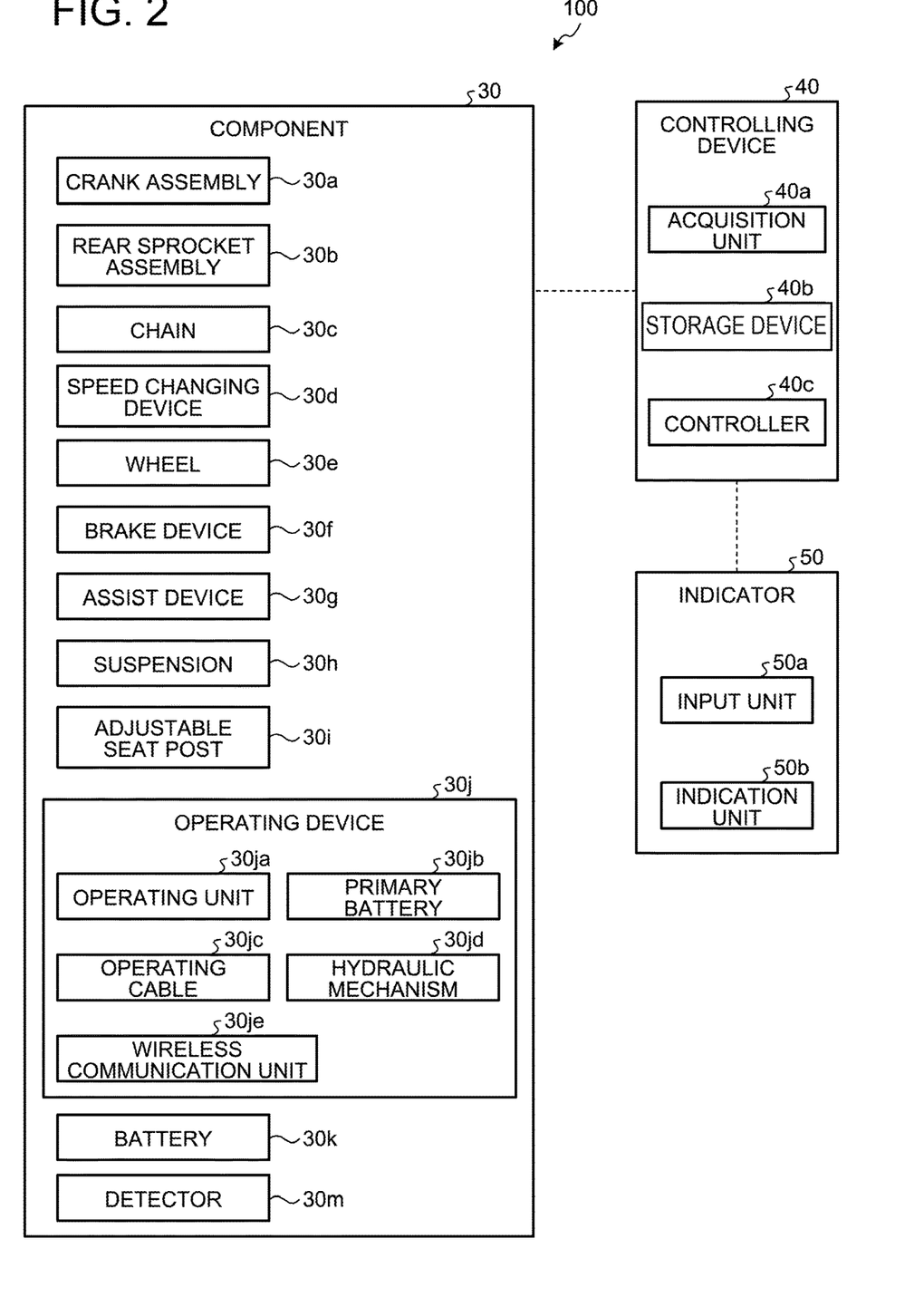
FIG. 2 is a block diagram of an indicating system according to the first embodiment.

FIG. 2 is a block diagram of the indicating system according to the first embodiment. As illustrated in FIG. 2, the components 30 includes a crank assembly 30a, a rear sprocket assembly 30b, a chain 30c, a speed changing device 30d, a wheel 30e, a brake device 30f, an assist device 30g, a suspension 30h, the adjustable seat post 30i, an operating device 30j, a battery 30k, and a detector 30m.

As illustrated in FIG. 1, the crank assembly 30a includes a crank shaft 30ax, a plurality of crank arms 30aa, and a front sprocket assembly 30ay. The crank shaft 30ax is rotatably supported by the frame 12 via a bottom bracket (not illustrated). The multiple crank arms 30aa are connected to the crank shaft 30ax such that the crank arms 30aa can rotate with respect to the frame 12. The front sprocket assembly 30ay includes sprockets 30as. The sprocket 30as is one of the sprockets included in the front sprocket assembly 30ay. The multiple sprockets 30as included in the front sprocket assembly 30ay are connected to one another. The front sprocket assembly 30ay is coupled to one crank arm 30aa via a one-way clutch (not illustrated). The multiple sprockets 30as are mutually different in the number of teeth. When the user applies force to pedals PD mounted on the crank arms 30aa, the crank shaft 30ax and the front sprocket assembly 30ay rotate. The number of sprockets 30as included in the front sprocket assembly 30ay is not limited to a specific number.

As illustrated in FIG. 1, the rear sprocket assembly 30b includes sprockets 30bs. The rear sprocket assembly 30b is mounted on a rear wheel 30eb, which is described later, via a one-way clutch (not illustrated). The rear sprocket assembly 30b rotates together with the rear wheel 30eb. The sprocket 30bs is one of the multiple sprockets 30bs included in the rear sprocket assembly 30b. The multiple sprockets 30bs are mutually different in the number of teeth. The number of sprockets 30bs included in the rear sprocket assembly 30b is not limited to a specific number.

The chain 30c is a member that transmits force input to the crank assembly 30a to the rear sprocket assembly 30b. As illustrated in FIG. 1, the chain 30c is wound around one of the multiple sprockets 30as included in the crank assembly 30a. The chain 30c is wound around one of the multiple sprockets 30bs included in the rear sprocket assembly 30b.

Force applied to the crank assembly 30a is transmitted to the rear sprocket assembly 30b via the chain 30c, thereby causing the rear wheel 30eb to rotate.

As illustrated in FIG. 1, the speed changing device 30d includes a front derailleur 30da and a rear derailleur 30db. The front derailleur 30da is a mechanism to change the sprocket 30as around which the chain 30c is wound from one sprocket 30as to another sprocket 30as in the crank assembly 30a. The rear derailleur 30db is a mechanism to change the sprocket 30bs around which the chain 30c is wound from one sprocket 30bs to another sprocket 30bs in the rear sprocket assembly 30b. By changing the sprocket 30as around which the chain 30c is wound or changing the sprocket 30bs around which the chain 30c is wound, a speed shift ratio of the man-powered vehicle 10 is changed.

As illustrated in FIG. 1, the wheel 30e includes a front wheel 30ea and the rear wheel 30eb. The front wheel 30ea is mounted on the fork 15. The front wheel 30ea is rotatable with respect to the frame 12. The rear wheel 30eb is mounted on a rear end, which is defined as the connecting portion where the seat stay 12e and the chain stays 12f are connected. The rear wheel 30eb is rotatable with respect to the frame 12.

As illustrated in FIG. 1, the brake device 30f includes a front brake 30fa and a rear brake 30fb. The front brake 30fa is a mechanism that brakes the front wheel 30ea. The front brake 30fa includes a brake shoe (brake pad). As a result of the contact of the brake shoe of the front brake 30fa with the front wheel 30ea, friction occurs therebetween, resulting in the rotational speed of the front wheel 30ea being reduced. The rear brake 30fb is a mechanism that brakes the rear wheel 30eb. The rear brake 30fb includes a brake shoe (brake pad). As a result of the contact of the brake shoe with the rear wheel 30eb, friction occurs therebetween, resulting the rotational speed of the rear wheel 30eb being reduced. Each of the front brake 30fa and the rear brake 30fb is not limited to a rim brake. A roller brake or a disk brake may be employed, for example.

As illustrated in FIG. 1, the assist device 30g is disposed on the periphery of the crank assembly 30a. The assist device 30g is mounted on the frame 12. The assist device 30g assists driving of the man-powered vehicle 10. The assist device 30g includes an electric motor and assists rotation of the crank assembly 30a. For example, torque of the electric motor is transmitted to the crank assembly 30a via a reducer.

As illustrated in FIG. 1, the suspension 30h is provided on the fork 15. The suspension 30h includes a damper. The suspension 30h attenuates vibration input to the front wheel 30ea. The suspension 30h reduces vibration transmitted to the user from the front wheel 30ea. The suspension 30h can switch between an unlocked state where the damper is operated and a locked state where the damper is not operated, for example.

As illustrated in FIG. 1, the adjustable seat post 30i is mounted on the seat tube 12d. The adjustable seat post 30i supports the saddle 16. The adjustable seat post 30i is a mechanism that adjusts the height of the saddle 16. The adjustable seat post 30i includes two members that are capable of sliding relative to each other, thereby making it possible to lift the saddle 16 up and down.

The operating device 30j is a device for operating at least one of the speed changing device 30d, the brake device 30f, the assist device 30g, the suspension 30h, and the adjustable seat post 30i. As illustrated in FIG. 2, the operating device 30j includes an operating unit 30ja, a primary battery 30jb, an operating cable 30jc, a hydraulic mechanism 30jd, and a wireless communication unit 30je.

The operating unit 30ja is an input device for operating the speed changing device 30d, the brake device 30f, the assist device 30g, the suspension 30h, or the adjustable seat post 30i. The operating unit 30ja is disposed on the handlebar 14, for example. The operating unit 30ja includes a plurality of levers and a plurality of switches, for example.

The primary battery 30jb supplies electric power to the wireless communication unit 30je. The primary battery 30jb is a button-shaped battery, for example.

The operating cable 30jc is a member for operating the brake device 30f, for example. The operating cable 30jc is a Bowden cable, for example. The operating cable 30jc is actuated in accordance with operation input to the operating unit 30ja, resulting in the front brake 30fa and the rear brake 30fb being operated. The operating cable 30jc may be a member for operating at least one of the speed changing device 30d, the suspension 30h, and the adjustable seat post 30i.

The hydraulic mechanism 30jd is a mechanism for operating at least one of the suspension 30h and the adjustable seat post 30i, for example. The hydraulic mechanism 30jd includes hydraulic oil and operates the suspension 30h and the adjustable seat post 30i by changing pressure of the hydraulic oil in accordance with the operation input to the operating unit 30ja. The hydraulic mechanism 30jd may be a mechanism for operating at least one of the speed changing device 30d and the brake device 30f.

The wireless communication unit 30je is configured to operate at least one of the speed changing device 30d and the assist device 30g, for example. The wireless communication unit 30je can transmit wireless signals. The wireless communication unit 30je transmits a wireless signal according to operation input to the operating unit 30ja to at least one of the speed changing device 30d and the assist device 30g. At least one of the speed changing device 30d and the assist device 30g is configured to receive the wireless signal from the wireless communication unit 30je. The speed changing device 30d changes the sprocket 30as or the sprocket 30bs around which the chain 30c is wound in accordance with the wireless signal received from the wireless communication unit 30je. The assist device 30g changes at least one of whether to assist the driving, a level of the assist, and an assist ratio, for example, in accordance with the wireless signal received from the wireless communication unit 30je. The wireless communication unit 30je may be configured to operate at least one of the brake device 30f, the suspension 30h, and the adjustable seat post 30i.

The battery 30k is a rechargeable battery (secondary battery). The battery 30k is mounted on the down tube 12c, for example. The battery 30k is coupled to the assist device 30g by being wired and supplies electric power to the assist device 30g. The electric power of the battery 30k drives the electric motor of the assist device 30g.

The detector 30m is a sensor that measures history information about usage histories of the components 30. The detector 30m includes an acceleration sensor, a load sensor, a speed sensor, a wind sensor, a gyroscope sensor, and a global positioning system (GPS) receiver, for example. The detector 30m is provided on at least one of the frame 12, the handlebar 14, the fork 15, the saddle 16, the crank assembly 30a, the rear sprocket assembly 30b, the chain 30c, the speed changing device 30d, the wheel 30e, the brake device 30f, the assist device 30g, the suspension 30h, the adjustable seat post 30i, the operating device 30j, and the battery 30k.

The controlling device 40 is a computer and includes a processor such as a central processing unit (CPU), read only memory (ROM), random access memory (RAM), and flash memory, for example. Respective functions of the controlling device 40 are implemented as a result of cooperation among them. As illustrated in FIG. 2, the controlling device 40 includes an acquisition unit 40a, a storage device 40b, and controller 40c.

The acquisition unit 40a acquires the history information about the usage histories of the component 30 from the detector 30m. The storage device 40b stores therein predetermined information about durability of the component 30, and may be comprised of one or more types of the memory discussed above. The controller 40c controls the indicator 50 based on the predetermined information stored in the storage device 40b, and may be comprised of the processor configured to execute software stored in the memory. The controlling device 40 includes the storage device 40b that stores therein the predetermined information about the durability of the component 30 of the man-powered vehicle 10, and the controller 40c that controls the indicator 50 based on the predetermined information. The storage device 40b further stores therein the history information acquired by the acquisition unit 40a. The controller 40c controls the indicator 50 based on the predetermined information and the history information.

The predetermined information includes the timing (predetermined date) at which maintenance of each of the components 30 becomes necessary, for example. The predetermined information includes a threshold used for comparison with the history information. The predetermined information can be changed by the information input to the controlling device 40 by the user or the history information input to the controlling device 40 from the components 30. The examples of the maintenance of the component 30 include replacement of the component 30, adjustment of the component 30, and cleaning of the component 30.

The history information includes a driving distance of the man-powered vehicle 10, a driving period of the man-powered vehicle 10, and the number of speed shifts performed in the man-powered vehicle 10. The driving distance of the man-powered vehicle 10 means the sum of a moving distance when the man-powered vehicle 10 actually runs forward and a virtual moving distance. That is, the driving distance of the man-powered vehicle 10 includes a virtual moving distance of the man-powered vehicle 10 placed on bicycle rollers. The actual moving distance is measured by the GPS, for example. The acquisition unit 40a calculates a virtual distance from various types of information acquired from the detector 30m. For example, the virtual distance is calculated by multiplying a period in which the man-powered vehicle 10 is driven, the number of rotations of the crank assembly 30a per a predetermined period, a speed shift ratio of the man-powered vehicle 10, and a circumferential length of the wheel 30e. The driving period of the man-powered vehicle 10 is an integrated value of periods in which the driving distance of the man-powered vehicle 10 is increased. The number of speed shifts performed in the man-powered vehicle 10 is the number of speed shifts performed by the speed changing device 30d. The number of speed shifts performed in the man-powered vehicle 10 is the number of speed shifts performed by the front derailleur 30da or the rear derailleur 30db.

The history information includes the driving distance of each of the sprockets 30as, the driving period of each of the sprockets 30as, the driving distance of each of the sprockets 30bs, and the driving period of each of the sprockets 30bs.

The driving distance of the sprocket 30as is the moving distance of the sprocket 30as in a state where the chain 30c is wound around the sprocket 30as. The driving distance of the sprocket 30as is a value obtained by multiplying the number of rotations of the sprocket 30as by the circumferential length of the sprocket 30as in a period in which the chain 30c is wound around the sprocket 30as, for example. The driving distance of the sprocket 30as may be a value obtained by multiplying a period in which the chain 30c is wound around the sprocket 30as, the number of rotations of the crank assembly 30a per a predetermined period, a speed shift ratio of the man-powered vehicle 10, and the circumferential length of the wheel 30e. The driving period of the sprocket 30as is an integrated value of periods in which the driving distance of the sprocket 30as is increased. The driving distance of the sprocket 30bs is the moving distance of the sprocket 30bs in a state where the chain 30c is wound around the sprocket 30bs. The driving distance of the sprocket 30bs is a value obtained by multiplying the number of rotations of the sprocket 30bs by the circumferential length of the sprocket 30bs in a period in which the chain 30c is wound around the sprocket 30bs. The driving distance of the sprocket 30bs may be a value obtained by multiplying a period in which the chain 30c is wound around the sprocket 30bs, the number of rotations of the crank assembly 30a, a speed shift ratio of the man-powered vehicle 10, and the circumferential length of the wheel 30e. The driving period of the sprocket 30bs is an integrated value of periods in which the driving distance of the sprocket 30bs is increased.

The history information includes an operating period of the speed changing device 30d and the number of operations of the speed changing device 30d. The operating period of the speed changing device 30d is an integrated value of periods in which the speed changing device 30d is in a speed change operation. The operating period of the speed changing device 30d is the operating period of the front derailleur 30da or the operating period of the rear derailleur 30db. The number of operations of the speed changing device 30d is the number of times that the speed changing device 30d performs the speed change operation. The number of operations of the speed changing device 30d is the number of operations of the front derailleur 30da or the number of operations of the rear derailleur 30db. The number of operations of the speed changing device 30d may include the number of times that the speed changing device 30d fails to perform the speed change operation. The number of times that the speed changing device 30d fails to perform the speed change operation is the number of cases where an impact in speed change is larger than a predetermined size, for example.

The history information includes the number of rotations of the wheel 30e in the predetermined moving distance of the man-powered vehicle 10, and weight information about a weight of the man-powered vehicle 10 in a ride state. The predetermined moving distance of the man-powered vehicle 10 is the moving distance when the man-powered vehicle 10 actually runs forward. The number of rotations of the wheel 30e is the number of rotations of the front wheel 30ea or the number of rotations of the rear wheel 30eb. The weight information about the weight of the man-powered vehicle 10 in a ride state represents the weight of the user riding on the man-powered vehicle 10 or the sum of the weight of the man-powered vehicle 10 and the weight of the user riding on the man-powered vehicle 10. The ride state is a state in which the user rides on the man-powered vehicle 10.

The history information includes the operating period of the brake device 30f and the number of operations of the brake device 30f. The operating period of the brake device 30f is an integrated value of periods in which the brake device 30f brakes the wheel 30e. The operating period of the brake device 30f is an integrated value of periods in which the brake shoe of the front brake 30fa is in contact with the front wheel 30ea or an integrated value of periods in which the brake shoe of the rear brake 30fb is in contact with the rear wheel 30eb. The number of operations of the brake device f30 is the number of times that the brake device f30 performs brake operation. The number of operations of the brake device f30 is the number of operations of the front brake 30fa or the number of operations of the rear brake 30fb.

The history information includes a usage period of the suspension 30h, the operating period of the suspension 30h, and the number of operations of the suspension 30h. The usage period is a period elapsed from the latest maintenance of the component 30. The operating period of the suspension 30h is an integrated value of periods in which the suspension 30h is in the unlocked state and the man-powered vehicle 10 is in the ride state. The number of operations of the suspension 30h is the number of times that the suspension 30h buffers an impact.

The history information includes the usage period of the adjustable seat post 30i, the operating period of the adjustable seat post 30i, and the number of operations of the adjustable seat post 30i. The operating period of the adjustable seat post 30i is an integrated value of periods in which the adjustable seat post 30i operates. The number of operations of the adjustable seat post 30i is the number of times that the adjustable seat post 30i operates.

The history information includes the operating period of the operating device 30j, the number of operations of the operating device 30j, the usage period of the operating cable 30jc, the number of operations of the operating cable 30jc, the usage period of the hydraulic oil of the hydraulic mechanism 30jd, and the usage period of the primary battery 30jb. The operating period of the operating device 30j is an integrated value of periods in which the operating device 30j is operated. The number of operations of the operating device 30j is the number of times that the operating unit 30ja of the operating device 30j is operated. The number of operations of the operating cable 30jc is the number of times that the operating cable 30jc is operated.

The history information includes the number of charging times of the battery 30k, the number of discharging times of the battery 30k, and a deteriorating state of the battery 30k. The number of charging times of the battery 30k is the number of times that the battery 30k is charged. The number of discharging times of the battery 30k is the number of times that the battery 30k is discharged. The deteriorating state of the battery 30k is what is called a state of a health (SOH). The SOH is a value obtained by dividing a current full charge capacity by an initial full charge capacity.

The history information of a certain one component 30 may be reset when the maintenance of the certain one component 30 has been performed.

The component 30 may not necessarily include all of the constituent elements illustrated in FIG. 2. The components 30 may include at least one of the chain 30c, the rear sprocket assembly 30b, the crank assembly 30a, the speed changing device 30d, the wheel 30e, the brake device 30f, the assist device 30g assisting driving of the man-powered vehicle 10, the suspension 30h, the adjustable seat post 30i, the operating device 30j, and the battery 30k. The operating device 30j may not necessarily include all of the constituent elements illustrated in FIG. 2. The operating device 30j may include at least one of the operating unit 30ja, the operating cable 30jc, the hydraulic mechanism 30jd, the primary battery 30jb, and the wireless communication unit 30je.

When the components 30 includes the chain 30c, the history information preferably includes at least one of the driving distance of the man-powered vehicle 10, the driving period of the man-powered vehicle 10, and the number of speed shifts performed in the man-powered vehicle 10. The driving distance of the man-powered vehicle 10, the driving period of the man-powered vehicle 10, and the number of speed shifts performed in the man-powered vehicle 10 influences a current state of the chain 30c. When the history information includes at least one of the driving distance of the man-powered vehicle 10, the driving period of the man-powered vehicle 10, and the number of speed shifts performed in the man-powered vehicle 10, the controlling device 40 can control the indicator 50 based on the current state of the chain 30c.

When the components 30 includes the sprocket 30as (sprocket 30bs), the history information preferably includes at least one of the driving distance of the man-powered vehicle 10, the driving period of the man-powered vehicle 10, and the number of speed shifts performed in the man-powered vehicle 10. The driving distance of the man-powered vehicle 10, the driving period of the man-powered vehicle 10, and the number of speed shifts performed in the man-powered vehicle 10 influence a current state of the sprocket 30as (sprocket 30bs). When the history information includes at least one of the driving distance of the man-powered vehicle 10, the driving period of the man-powered vehicle 10, and the number of speed shifts performed in the man-powered vehicle 10, the controlling device 40 can control the indicator 50 based on the current state of the sprocket 30as (sprocket 30bs).

When the components 30 includes the rear sprocket assembly 30b and the sprocket 30bs and the sprocket 30bs is one of the multiple sprockets 30bs included in the rear sprocket assembly 30b, the history information preferably includes at least one of the driving distance of each of the sprockets 30bs and the driving period of each of the sprockets 30bs. The driving distance of each of the sprockets 30bs and the driving period of each of the sprockets 30bs influence a current state of each of the sprockets 30bs. When the history information includes at least one of the driving distance of each of the sprockets 30bs and the driving period of each of the sprockets 30bs, the controlling device 40 can control the indicator 50 based on the current state of each of the sprockets 30bs.

When the components 30 includes the crank assembly 30a and the sprocket 30as is one of the multiple sprockets 30as included in the crank assembly 30a, the history information preferably includes at least one of the driving distance of each of the sprockets 30as and the driving period of each of the sprockets 30as. The driving distance of each of the sprockets 30as and the driving period of each of the sprockets 30as influence current state of each of the sprockets 30as. When the history information includes at least one of the driving distance of each of the sprockets 30as and the driving period of each of the sprockets 30as, the controlling device 40 can control the indicator 50 based on the current state of each of the sprockets 30as.

When the components 30 includes the speed changing device 30d, the history information preferably includes at least one of the operating period of the speed changing device 30d and the number of operations of the speed changing device 30d. The operating period of the speed changing device 30d and the number of operations of the speed changing device 30d influence a current state of the speed changing device 30d. When the history information includes at least one of the operating period of the speed changing device 30d and the number of operations of the speed changing device 30d, the controlling device 40 can control the indicator 50 based on the current state of the speed changing device 30d.

When the components 30 includes the wheel 30e, the history information preferably includes the number of rotations of the wheel 30e in a predetermined moving distance of the man-powered vehicle 10. The circumferential length of the front wheel 30ea and the circumferential length of the rear wheel 30eb correlate with air pressure of each corresponding tire. The controlling device 40 stored therein a correlation between the circumferential length of the front wheel 30ea and the air pressure of the tire, and a correlation between the circumferential length of the rear wheel 30eb and the air pressure of the tire, for example. The predetermined moving distance of the man-powered vehicle 10 is measured by the GPS included in the detector 30m and stored in the storage device 40b, for example. The controlling device 40, thus, can calculate the air pressure of the tire corresponding to the front wheel 30ea based on the number of rotations of the front wheel 30ea in the predetermined moving distance. Likewise, the controlling device 40 can calculate the air pressure of the tire corresponding to the rear wheel 30eb based on the number of rotations of the rear wheel 30eb in the predetermined moving distance. When the history information includes the number of rotations of the wheel 30e in a predetermined moving distance of the man-powered vehicle 10, the controlling device 40 can control the indicator 50 based on a current state of the wheel 30e.

When the components 30 includes the wheel 30e, the storage device 40b preferably stores therein the weight information about the weight of the man-powered vehicle 10 in the ride state, and the controller 40c preferably controls the indicator 50 based on the predetermined information, the history information, and the weight information. The storage device 40b storing therein the weight information allows the controlling device 40 to correct an error due to tire deformation in the ride state. The controlling device 40, thus, can increase accuracy in calculating the tire air pressure.

When the components 30 includes the brake device 30f, the history information preferably includes at least one of the operating period of the brake device 30f and the number of operations of the brake device 30f. The operating period of the brake device 30f and the number of operations of the brake device 30f influence a current state of the brake device 30f. When the history information includes at least one of the operating period of the brake device 30f and the number of operations of the brake device 30f, the controlling device 40 can control the indicator 50 based on the current state of the brake device 30f.

When the components 30 includes the assist device 30g assisting driving of the man-powered vehicle 10 by the electric motor, the history information preferably includes at least one of the driving distance of the man-powered vehicle 10 and the driving period of the man-powered vehicle 10. The driving distance of the man-powered vehicle 10 and the driving period of the man-powered vehicle 10 influence a current state of the assist device 30g. When the history information includes at least one of the driving distance of the man-powered vehicle 10 and the driving period of the man-powered vehicle 10, the controlling device 40 can control the indicator 50 based on the current state of the assist device 30g.

When the components 30 includes the suspension 30h, the history information preferably includes at least one of the driving distance of the man-powered vehicle 10, the driving period of the man-powered vehicle 10, the usage period of the suspension 30h, the operating period of the suspension 30h, and the number of operations of the suspension 30h. The driving distance of the man-powered vehicle 10, the driving period of the man-powered vehicle 10, the operating period of the suspension 30h, and the number of operations of the suspension 30h influence a current state of the suspension 30h. Sealing material provided on the suspension 30h may deteriorate as time elapses. The usage period of the suspension 30h, thus, influences a current state of the suspension 30h. When the history information includes at least one of the driving distance of the man-powered vehicle 10, the driving period of the man-powered vehicle 10, the usage period of the suspension 30h, the operating period of the suspension 30h, and the number of operations of the suspension 30h, the controlling device 40 can control the indicator 50 based on the current state of the suspension 30h.

When the components 30 includes the adjustable seat post 30i, the history information preferably includes at least one of the driving distance of the man-powered vehicle 10, the driving period of the man-powered vehicle 10, the usage period of the adjustable seat post 30i, the operating period of the adjustable seat post 30i, and the number of operations of the adjustable seat post 30i. The driving distance of the man-powered vehicle 10, the driving period of the man-powered vehicle 10, the operating period of the adjustable seat post 30i, and the number of operations of the adjustable seat post 30i influence a current state of the adjustable seat post 30i. Sealing material provided on the adjustable seat post 30i may deteriorate as time elapses. The usage period of the adjustable seat post 30i, thus, influences the current state of the adjustable seat post 30i. When the history information includes at least one of the driving distance of the man-powered vehicle 10, the driving period of the man-powered vehicle 10, the usage period of the adjustable seat post 30i, the operating period of the adjustable seat post 30i, and the number of operations of the adjustable seat post 30i, the controlling device 40 can control the indicator 50 based on the current state of the adjustable seat post 30i.

When the components 30 includes the operating device 30j for operating at least one of the speed changing device 30d, the brake device 30f, the assist device 30g assisting driving of the man-powered vehicle 10, the suspension 30h, and the adjustable seat post 30i, the history information preferably includes at least one of the operating period of the operating device 30j and the number of operations of the operating device 30j. The operating period of the operating device 30j and the number of operations of the operating device 30j influence a current state of the operating device 30j. When the history information includes at least one of the operating period of the operating device 30j and the number of operations of the operating device 30j, the controlling device 40 can control the indicator 50 based on the current state of the operating device 30j.

When the operating device 30j includes the operating cable 30jc, the history information preferably includes at least one of the operating period of the operating cable 30jc and the number of operations of the operating cable 30jc. The operating period of the operating cable 30jc and the number of operations of the operating cable 30jc influence a current state of the operating cable 30jc. When the history information includes at least one of the operating period of the operating cable 30*j* c and the number of operations of the operating cable 30*jc*, the controlling device 40 can control the indicator 50 based on the current state of the operating cable 30*jc*.

When the operating device 30*j* includes the hydraulic mechanism 30*jd*, the history information preferably includes at least one of the usage period of the operating device 30*j* and the usage period of the hydraulic oil of the hydraulic mechanism 30*jd*. Seal material and the hydraulic oil of the hydraulic mechanism 30*jd* may deteriorate as time elapses. The usage period of the operating device 30*j* and the usage period of the hydraulic oil of the hydraulic mechanism 30*jd*, thus, influence a current state of the hydraulic mechanism 30*jd*. When the history information includes at least one of the usage period of the operating device 30*j* and the usage period of the hydraulic oil of the hydraulic mechanism 30*jd*, the controlling device 40 can control the indicator 50 based on the current state of the hydraulic mechanism 30*jd*.

When the operating device 30*j* includes the primary battery 30*jb*, the history information preferably includes the usage period of the primary battery 30*jb* in the operating device 30*j*. The remaining amount in the primary battery 30*jb* is reduced even when the primary battery 30*jb* is simply mounted on the operating device 30*j*. The usage period of the primary battery 30*jb*, thus, influences a current state of the primary battery 30*jb*. When the history information includes the usage period of the primary battery 30*jb*, the controlling device 40 can control the indicator 50 based on the current state of the primary battery 30*jb*.

When the components 30 includes the rechargeable battery 30*k*, the history information preferably includes at least one of the number of charging times of the battery 30*k*, the number of discharging times of the battery 30*k*, and the deteriorating state of the battery 30*k*. The number of charging times of the battery 30*k*, the number of discharging times of the battery 30*k*, and the deteriorating state of the battery 30*k* influence a current state of the battery 30*k*. When the history information includes at least one of the number of charging times of the battery 30*k*, the number of discharging times of the battery 30*k*, and the deteriorating state of the battery 30*k*, the controlling device 40 can control the indicator 50 based on the current state of the battery 30*k*.

The indicator 50 is a device that indicates information about the maintenance of the component 30 to the user of the man-powered vehicle 10. Examples of the information about the maintenance of the component 30 include a period remaining to the timing at which the maintenance should be performed on the component 30, and a period having elapsed from the timing at which the maintenance should have been performed on the component 30. The indicator 50 in the first embodiment is a cycle computer, for example. The indicator 50 is not limited to the cycle computer. The indicator 50 may include at least one of the cycle computer, eyewear, a smartphone, a tablet device, a smart watch, a personal computer, a lamp, and a speaker. The indicator 50 may also be a compact dedicated device (having a size capable of being put in a pocket of clothing, for example). The indicator 50 may output at least one of sound, light, and vibration. The indicator 50 may output light or vibration. The indicator 50 may output a combination of light and vibration.

Figure 3:
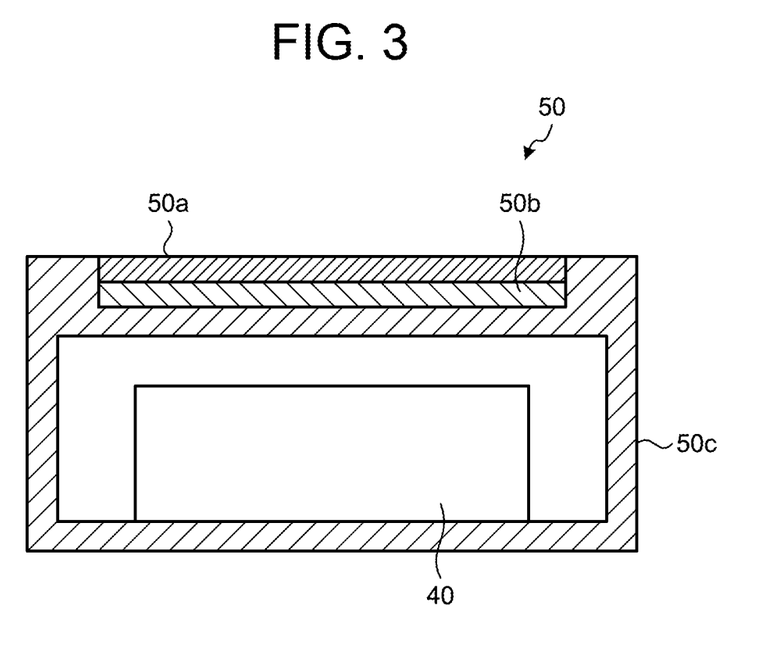
FIG. 3 is a cross-sectional view of an indicator according to the first embodiment.

FIG. 3 is a cross-sectional view of the indicator according to the first embodiment. As illustrated in FIG. 3, the indicator 50 includes a housing 50*c* including therein the controlling device 40. The housing 50*c* is a member that has a boxy shape and is made of resin or metal, for example. In the first embodiment, the housing 50*c* is mounted on the handlebar 14.

As illustrated in FIG. 2, the indicator 50 is provided with an input unit 50*a* and an indication unit 50*b*. The input unit 50*a* is an input interface that receives the user's input. The input unit 50*a* is a button, a microphone, or a touch panel, for example. The indication unit 50*b* is an output interface that causes the user to recognize the information. The indication unit 50*b* is a light emitting diode (LED), a liquid crystal panel, a speaker, or a vibrator, for example.

Figure 4:
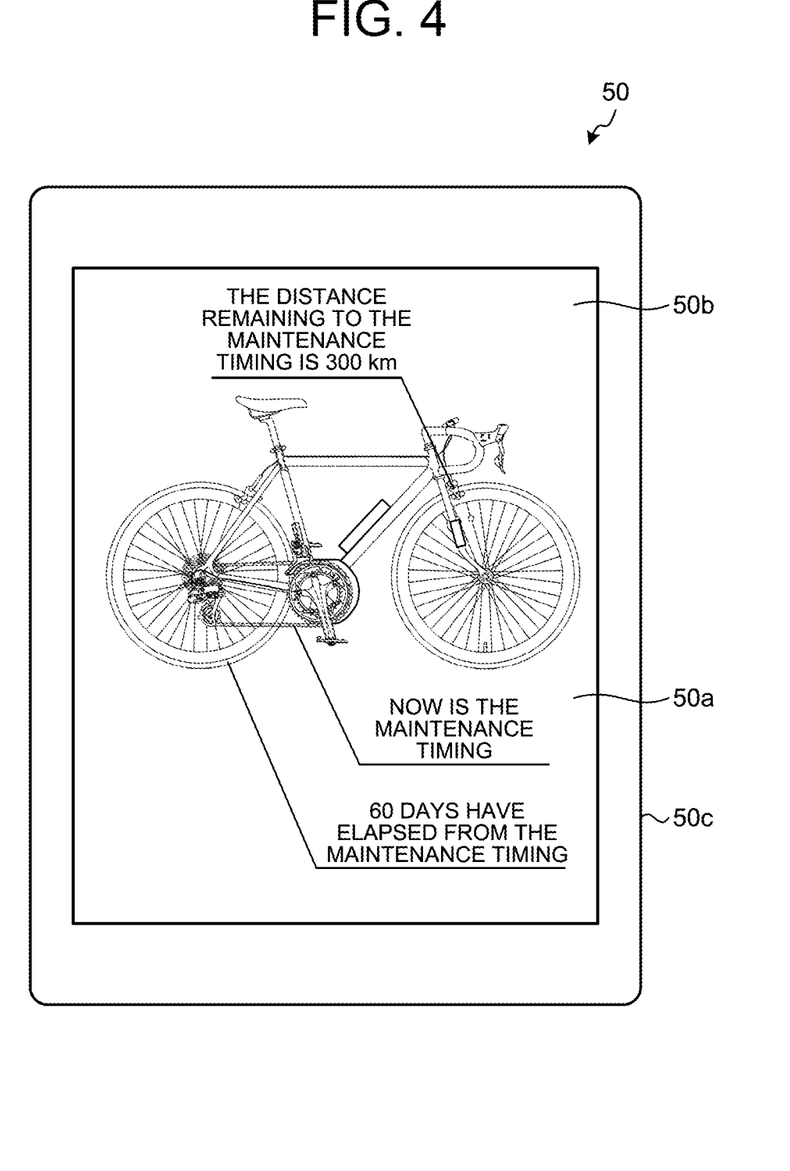
FIG. 4 is a front view of the indicator according to the first embodiment.

FIG. 4 is a front view of the indicator according to the first embodiment. In the first embodiment, the input unit 50*a* includes a touch pad. The indication unit 50*b* includes a liquid crystal panel. As illustrated in FIG. 4, on the indication unit 50*b*, at least an image of the man-powered vehicle 10 including the component 30, and the information about the maintenance of the component 30 are displayed. The image of the man-powered vehicle 10 may be a photograph or a schematic drawing of the man-powered vehicle 10, for example. Messages as illustrated in FIG. 4, such as "the distance remaining to the maintenance timing is 300 km", "now is the maintenance timing", and "60 days have elapsed from the maintenance timing", are examples of the information about the maintenance of the component 30. The information about the maintenance of the component 30 is not limited to that illustrated in FIG. 4. The number of pieces of the information about the maintenance of the component 30 and being displayed on the indication unit 50*b* may be one or two or more. The indication unit 50*b* may display the information about the maintenance of the component 30 as a mark, for example. The indication unit 50*b* may include a speaker, for example. The indication unit 50*b* may output the information about the maintenance of the component 30 as a voice. The indication unit 50*b* may include a vibrator, for example. The indication unit may output the information about the maintenance of the component 30 as vibration.

The user inputs information indicating that the maintenance of the component 30 is completed to the controlling device 40 after the maintenance of the component 30 is performed. In the first embodiment, the user inputs the information to the controlling device 40 via the input unit 50*a* of the indicator 50. When the controlling device 40 includes an input unit, the user directly inputs the information to the controlling device 40. When acquiring the information indicating that the maintenance of the component 30 is completed, the controlling device 40 resets the history information of the component 30. Thereafter, the controlling device 40 starts acquisition of the history information of the component 30.

The controlling device 40 may not necessarily be included in the indicator 50. For example, the controlling device 40 may be included in any component 30. The indicator 50 may not necessarily belong to the user of the man-powered vehicle 10. For example, the indicator 50 may be provided by a dealer (distributor) of the man-powered vehicle 10. In this case, the dealer having acquired the information about the maintenance of the component 30 from the indicator 50 informs the user of the acquired information.

Figure 5:
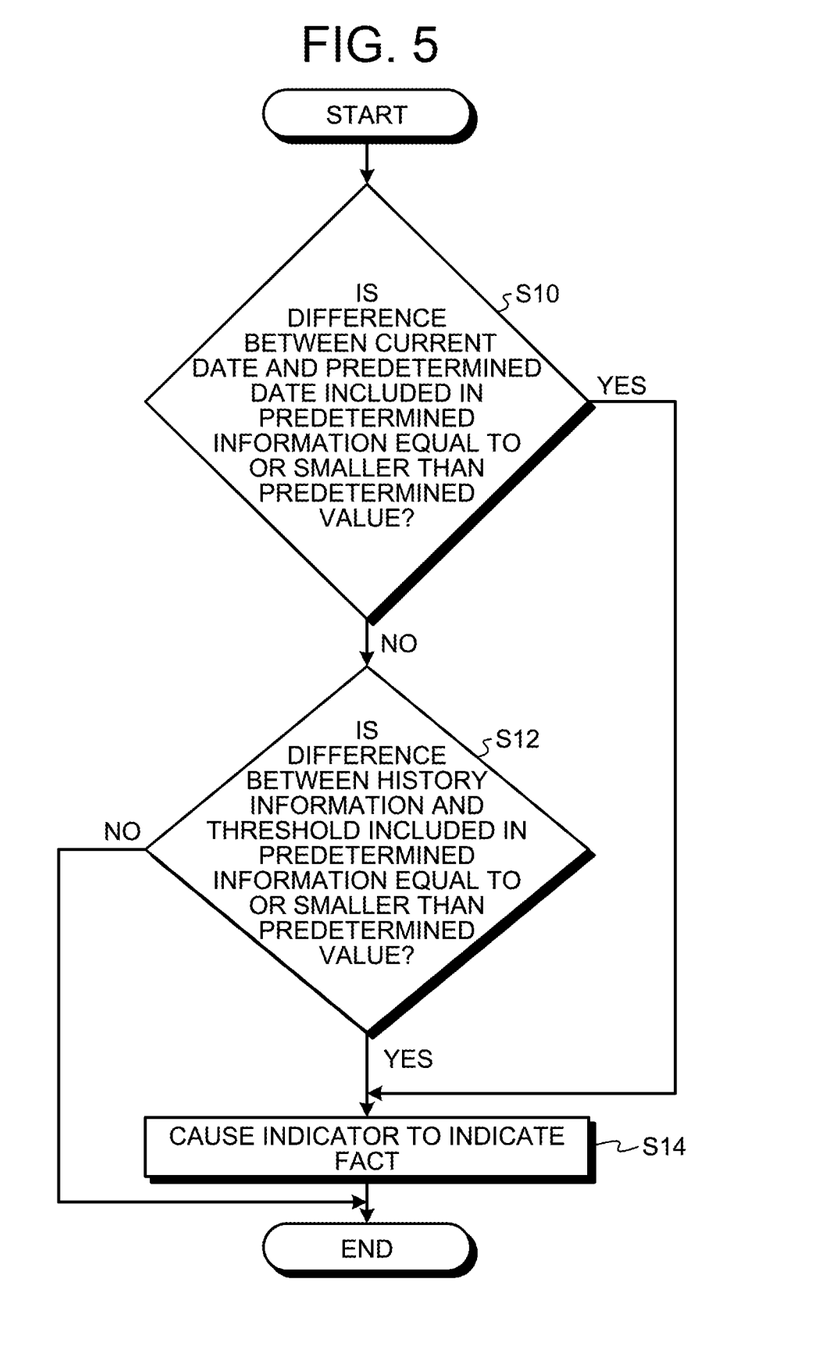
FIG. 5 is a flowchart of a controlling method according to the first embodiment.

FIG. 5 is a flowchart of a controlling method according to the first embodiment. The method for controlling the indicator 50 by the controlling device 40 includes first step S10 of controlling the indicator 50 based on the predetermined information about the durability of the component 30 of the man-powered vehicle 10. The predetermined information includes a predetermined date for the maintenance of the component 30, for example. If a difference between the current date and the predetermined date is equal to or smaller than a predetermined value (Yes at first step S10), the controlling device 40 causes the indicator 50 to indicate that fact (third step S14). The predetermined value is stored in the storage device 40b. For example, in a case where the predetermined value is 20 days, the controlling device 40 causes the indicator 50 to indicate that fact at the time when the current date is 20 days before the predetermined date. The controlling device 40 causes the indicator 50 to output information corresponding to the difference between the current date and the predetermined date. For example, when the current date is 10 days before the predetermined date, the controlling device 40 causes the indicator 50 to indicate that 10 days remains to perform the maintenance on the component 30.

If the difference between the current date and the predetermined date included in the predetermined information is not equal to or smaller than the predetermined value (No at first step S10), the control flow of the controlling device 40 proceeds to second step S12.

The method for controlling the indicator 50 by the controlling device 40 includes second step S12 of controlling the indicator 50 based on the predetermined information and the history information about the usage histories of the component 30. The predetermined information includes thresholds each corresponding to one of pieces of information included in the history information. If a difference between the history information and the threshold included in the predetermined information is equal to or smaller than a predetermined value (Yes at second step S12), the controlling device 40 causes the indicator 50 to indicate that fact (third step S14). The predetermined values respectively corresponding to pieces of history information are stored in the storage device 40b. The controlling device 40 causes the indicator 50 to output the information corresponding to the difference between the history information and the threshold included in the predetermined information. For example, when a difference between the driving distance of the man-powered vehicle 10 included in the history information and the driving distance included in the predetermined information is equal to or smaller than the predetermined value, the controlling device 40 causes the indicator 50 to indicate the maintenance timing for the component 30.

If the history information does not exceed the threshold included in the predetermined information (No at second step S12), the controlling device 40 ends the control flow. The controlling device 40 repeats the control flow illustrated in FIG. 5 at predetermined time intervals.

The method for controlling the indicator 50 by the controlling device 40 may not include first step S10. The method for controlling the indicator 50 by the controlling device 40 may not include second step S12.

When the controlling method does not include second step S12, the history information of the component 30 has no relation to the controlling method. As an example of such a case, the controlling device 40 and the indicator 50 are assembled in a single computer (e.g., a smartphone). For example, the user inputs the date for maintenance of the component 30 into an application of the smartphone. The application sets the maintenance timing of the component 30. The user may set the maintenance timing. The application indicates the information about the maintenance of the component 30 based on the set maintenance timing and the current date. The application sets a moving distance used for performing the maintenance on the component 30. The user may set the moving distance used for performing the maintenance on the component 30. The application memorizes the moving distance of the user based on the GPS included in the smartphone. For example, the application adds up the moving distances when a moving speed of the user is equal to or larger than a predetermined speed (a minimum speed when the user moves by the man-powered vehicle 10). The application indicates the information about the maintenance of the component 30 based on the set moving distance and the integrated moving distance. In other words, at first step S10 in the controlling method, the controlling device 40 may not necessarily control the indicator 50 based on the current date and the predetermined date. As described above, the controlling device 40 may control the indicator 50 based on the user's moving distance and the predetermined distance included in the predetermined information.

Second Embodiment

Figure 6:
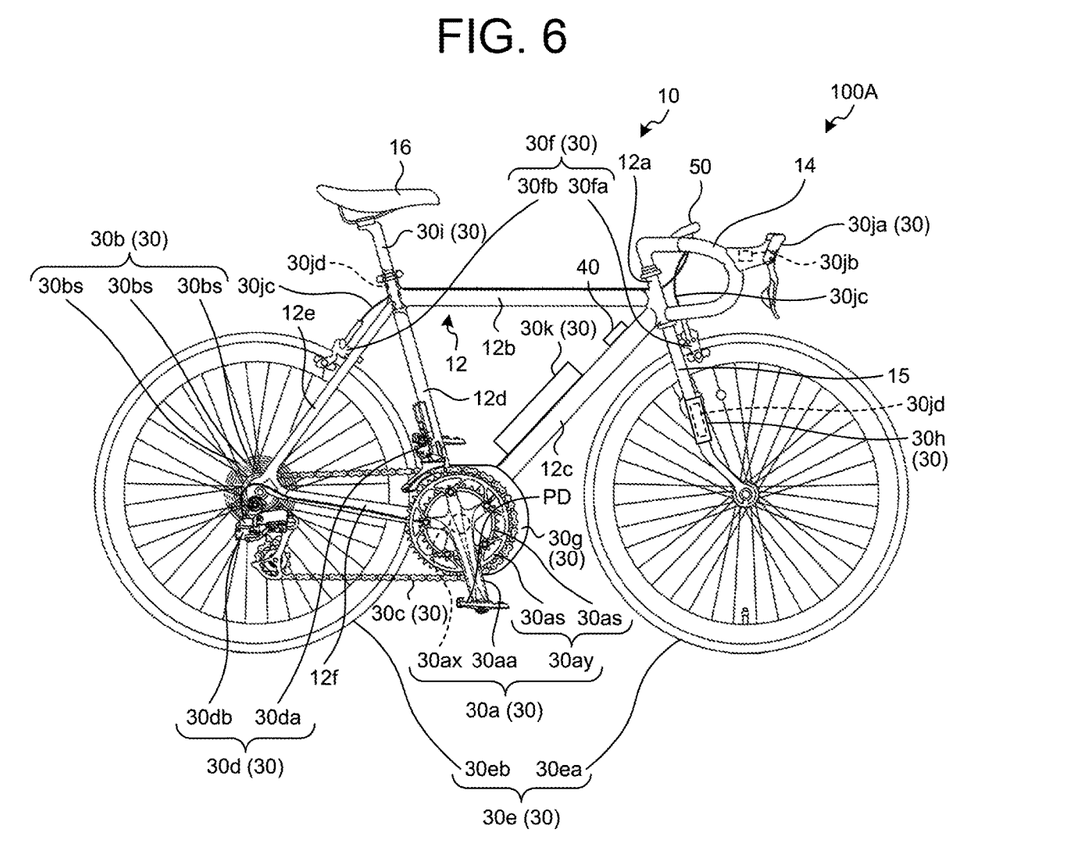
FIG. 6 is a schematic front view of a man-powered vehicle according to a second embodiment.

FIG. 6 is a schematic front view of a man-powered vehicle according to a second embodiment. An indicating system 100A according to the second embodiment differs from the indicating system 100 according to the first embodiment in that the indicator 50 does not include the controlling device 40. Descriptions of common configurations in the second embodiment to those in the first embodiment are omitted.

In the second embodiment, as illustrated in FIG. 6, the controlling device 40 is mounted on the man-powered vehicle 10. The indicator 50 is mounted on the man-powered vehicle 10 separated from the controlling device 40. The indicator 50 is more compact than that in the first embodiment because the indicator 50 does not include the controlling device 40. In the man-powered vehicle 10, restriction in arranging the controlling device 40 and the indicator 50 are reduced. The indicating system 100A increases the flexibility in the arrangement of the controlling device 40 and the indicator 50.

Third Embodiment

Figure 7:
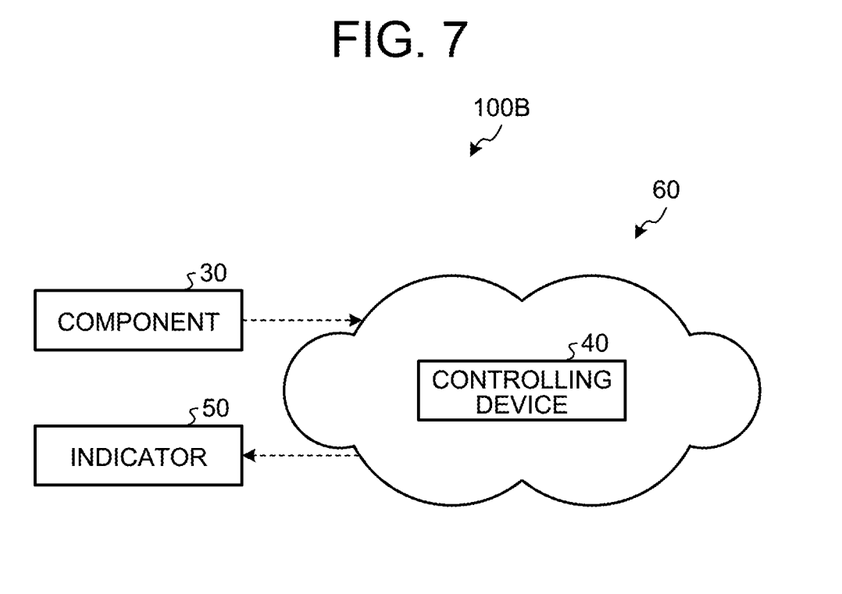
FIG. 7 is a schematic diagram illustrating an indicating system according to a third embodiment.

FIG. 7 is a schematic diagram of an indicating system according to a third embodiment. As illustrated in FIG. 7, in an indicating system 100B according to the third embodiment, the controlling device 40 is part of a cloud 60. The cloud 60 is also called cloud computing. The cloud 60 includes a server. For example, the controlling device 40 is included in the server of the cloud 60. The component 30 transmits the history information to the controlling device 40 included in the cloud 60 via the Internet. The indicator 50 indicates the fact based on the information transmitted from the controlling device 40 via the Internet. The indicating system 100B does not need to mount the controlling device 40 on the man-powered vehicle 10.

While certain embodiments of the present invention have been described, the description thereof is not intended to limit the embodiments. The constituting elements described herein include elements easily achieved by one skilled in the art, elements being substantially the same as the constituting elements, and elements within the scope of equivalents of the constituting elements. The constituting elements described herein may be combined in an appropriate manner. Furthermore, various omissions, substitutions and changes in the constituting elements may be made without departing from the spirit of the embodiments.

REFERENCE CHARACTER LIST

10 Man-powered vehicle
100, 100A, 100B Indicating system

12 Frame
12a Head tube
12b Top tube
12c Down tube
12d Seat tube
12e Seat stay
12f Chain stay
14 Handlebar
15 Fork
16 Saddle
30 Component
30a Crank assembly
30aa Crank arm
30as Sprocket
30ax Crank shaft
30ay Front sprocket assembly
30b Rear sprocket assembly
30bs Sprocket
30c Chain
30d Speed changing device
30da Front derailleur
30db Rear derailleur
30e Wheel
30ea Front wheel
30eb Rear wheel
30f Brake device
30fa Front brake
30fb Rear brake
30g Assist device
30h Suspension
30i Adjustable seat post
30j Operating device
30ja Operating unit
30jb Primary battery
30jc Operating cable
30jd Hydraulic mechanism
30je Wireless communication unit
30k Battery
30m Detector
40 Controlling device
40a Acquisition unit
40b Storage device
40c Controller
50 Indicator
50a Input unit
50b Indication unit
50c Housing
60 Cloud
PD Pedal

The invention claimed is:

1. A controlling device comprising:
a storage device configured to store predetermined information about durability of a component of a man-powered vehicle and history information about usage histories of the component; and
a controller including a processor configured to control an indicator based on the predetermined information, wherein
the history information includes a total count of a number of speed shifts that have been performed by a speed changing device of the man-powered vehicle,
the predetermined information includes a threshold for comparison with the history information, and
the processor controls the indicator based on a difference between the history information and the threshold included in the predetermined information.

2. The controlling device according to claim 1, wherein the component includes a chain, and
the history information further includes at least one of a driving distance of the man-powered vehicle and a driving period of the man-powered vehicle.

3. The controlling device according to claim 1, wherein the component includes a sprocket, and
the history information further includes at least one of a driving distance of the man-powered vehicle and a driving period of the man-powered vehicle.

4. The controlling device according to claim 3, wherein the component includes a rear sprocket assembly,
the sprocket is one of a plurality of sprockets included in the rear sprocket assembly, and
the history information further includes at least one of a driving distance of each of the sprockets and a driving period of each of the sprockets.

5. The controlling device according to claim 3, wherein the component includes a crank assembly,
the sprocket is one of a plurality of sprockets included in the crank assembly, and
the history information further includes at least one of a driving distance of each of the sprockets and a driving period of each of the sprocket.

6. The controlling device according to claim 1, wherein the component includes the speed changing device, and
the history information further includes at least one of an operating period of the speed changing device and the number of operations of the speed changing device.

7. The controlling device according to claim 1, wherein the component includes a wheel, and
the history information further includes the number of rotations of the wheel in a predetermined moving distance of the man-powered vehicle.

8. The controlling device according to claim 7, wherein the storage device stores weight information about a weight of the man-powered vehicle in a ride state, and
the controller controls the indicator based on the predetermined information, the history information, and the weight information.

9. The controlling device according to claim 1, wherein the component includes a brake device, and
the history information further includes at least one of an operating period of the brake device and the number of operations of the brake device.

10. The controlling device according to claim 1, wherein the component includes an assist device assisting driving of the man-powered vehicle using an electric motor, and
the history information further includes at least one of a driving distance of the man-powered vehicle and a driving period of the man-powered vehicle.

11. The controlling device according to claim 1, wherein the component includes a suspension, and
the history information further includes at least one of a driving distance of the man-powered vehicle, a driving period of the man-powered vehicle, a usage period of the suspension, an operating period of the suspension, and the number of operations of the suspension.

12. The controlling device according to claim 1, wherein the component includes an adjustable seat post, and
the history information further includes at least one of a driving distance of the man-powered vehicle, a driving period of the man-powered vehicle, a usage period of the adjustable seat post, an operating period of the adjustable seat post, and the number of operations of the adjustable seat post.

13. The controlling device according to claim 1, wherein
the component includes an operating device operating at least one of the speed changing device, a brake device, an assist device assisting driving of the man-powered vehicle, a suspension, and an adjustable seat post, and
the history information further includes at least one of an operating period of the operating device and the number of times that the operating device is operated.

14. The controlling device according to claim 13, wherein
the operating device includes an operating cable, and
the history information further includes at least one of an operating period of the operating cable and the number of operations of the operating cable.

15. The controlling device according to claim 13, wherein
the operating device includes a hydraulic mechanism, and
the history information further includes at least one of a usage period of the operating device and a usage period of hydraulic oil of the hydraulic mechanism.

16. The controlling device according to claim 13, wherein
the operating device includes a primary cell, and
the history information further includes a usage period of the primary cell in the operating device.

17. The controlling device according to claim 1, wherein
the component includes a rechargeable battery, and
the history information further includes at least one of the number of times that the rechargeable battery is charged, the number of times that the rechargeable battery is discharged, and a deteriorating state of the rechargeable battery.

18. The controlling device according to claim 1, wherein the indicator includes at least one of a cycle computer, eyewear, a smartphone, a tablet device, a smart watch, a personal computer, a lamp, and a speaker.

19. The controlling device according to claim 1, wherein the indicator outputs at least one of sound, light, and vibration.

20. An indicating system comprising:
a controlling device according to claim 1; and
the indicator.

21. The indicating system according to claim 20, wherein the indicator is provided with a housing including therein the controlling device.

22. The indicating system according to claim 20, wherein the controlling device is mounted on the man-powered vehicle, and
the indicator is mounted apart from the controlling device on the man-powered vehicle.

23. The indicating system according to claim 20, wherein
the indicator is provided with an indication unit, and
the indication unit displays at least an image of the man-powered vehicle including the component, and information about maintenance of the component.

24. A controlling method comprising:
a first step of controlling an indicator based on a difference between history information about usage histories of a component of a man-powered vehicle and a threshold included in predetermined information about durability of the component, wherein
the history information includes a total count of a number of speed shifts that have been performed by a speed changing device of the man-powered vehicle.

25. The controlling method according to claim 24, wherein the component includes at least one of a chain, a sprocket, the speed changing device, a wheel, a brake device, an assist device assisting driving of the man-powered vehicle, a suspension, an adjustable seat post, an operating device, and a battery.

26. The controlling method according to claim 24, wherein the indicator includes at least one of a cycle computer, eyewear, a smartphone, a tablet device, a smart watch, a personal computer, a lamp, and a speaker.

27. A controlling device comprising:
a storage device configured to store predetermined information about durability of a component of a man-powered vehicle and history information about usage histories of the component;
an operating unit configured to operate a speed changing device; and
a controller including a processor configured to control an indicator based on the predetermined information, wherein
the history information includes a total count of a number of times that the operating unit operates the speed changing device,
the predetermined information includes a threshold for comparison with the history information, and
the processor controls the indicator based on a difference between the history information and the threshold included in the predetermined information.

* * * * *